United States Patent
Mardiks (10) Patent No.: US 8,457,621 B2
(45) Date of Patent: Jun. 4, 2013

(54) GENERIC IDENTITY MODULE FOR TELECOMMUNICATION SERVICES

(75) Inventor: Eitan Mardiks, Raanana (IL)

(73) Assignee: Sandisk IL Ltd., Kfar Saba (IL)

(*) Notice: Subject to any disclaimer, the term of this patent is extended or adjusted under 35 U.S.C. 154(b) by 990 days.

(21) Appl. No.: 12/020,551

(22) Filed: Jan. 27, 2008

(65) Prior Publication Data

US 2009/0191916 A1 Jul. 30, 2009

(51) Int. Cl.
  *H04M 3/00* (2006.01)
  *H04W 4/00* (2009.01)
  *H04B 1/38* (2006.01)

(52) U.S. Cl.
  USPC ..... 455/419; 455/418; 455/435.1; 455/435.2; 455/435.3; 455/558

(58) Field of Classification Search
  USPC .................. 455/418, 419, 435.1–435.3, 558, 455/186.1
  See application file for complete search history.

(56) References Cited

U.S. PATENT DOCUMENTS

| | | | |
|---|---|---|---|
| 5,557,679 A | 9/1996 | Julin et al. | |
| 7,828,208 B2 | 11/2010 | Gangi | |
| 2004/0198333 A1 | 10/2004 | Zanaty | |
| 2004/0242209 A1* | 12/2004 | Kruis et al. | 455/414.1 |
| 2005/0079863 A1* | 4/2005 | Macaluso | 455/419 |
| 2005/0182802 A1* | 8/2005 | Beaudou et al. | 708/200 |
| 2005/0204041 A1 | 9/2005 | Blinn et al. | |
| 2006/0205434 A1* | 9/2006 | Tom et al. | 455/558 |
| 2006/0253556 A1* | 11/2006 | Wallis et al. | 709/220 |
| 2008/0051062 A1* | 2/2008 | Lee | 455/411 |
| 2009/0124287 A1* | 5/2009 | Weiss et al. | 455/558 |
| 2009/0227290 A1 | 9/2009 | Chien | |

FOREIGN PATENT DOCUMENTS

| | | |
|---|---|---|
| EP | 0562890 A1 | 9/1993 |
| EP | 0920684 A1 | 6/1999 |
| EP | 0981803 A1 | 3/2000 |
| GB | 2378097 A | 1/2003 |
| WO | 2005/074238 A1 | 8/2005 |
| WO | 2007/006535 A1 | 1/2007 |
| WO | WO 2007006535 A1 * | 1/2007 |

OTHER PUBLICATIONS

European Search Report, EP Application No. 09250191, dated Jun. 2, 2009, 7 pages.
European Search Report, EP Application No. 09250195, dated Jun. 22, 2009, 8 pages.

(Continued)

*Primary Examiner* — Jean Gelin
*Assistant Examiner* — Dung Hong
(74) *Attorney, Agent, or Firm* — Tolar Law Group, PC (57) ABSTRACT

An identity module includes a memory and a processor. In the memory are stored installation code for installing in the memory a customization suite that associates the identity module with a communication services provider and communication code that, in combination with the customization suite, supports communication by a host of the identity module using services of the communication services provider. The processor executes the installation code to install the customization suite and then executes the communication code in support of the communication. Preferably, no portion of any such communication suite is stored initially in the identity module. The host requests the customization suite from a server that includes a communication interface for communicating with the host, a memory wherein is stored code for providing substantially the entire customization suite to the host, and a processor for executing the code.

20 Claims, 10 Drawing Sheets

OTHER PUBLICATIONS

Non-Final Office Action for U.S. Appl. No. 12/128,638 mailed Dec. 9, 2010, 12 pages.

Final Office Action for U.S. Appl. No. 12/126,638 mailed Apr. 5, 2011, 5 pages.

Non-Final Office Action mailed Nov. 19, 2010 in U.S. Appl. No. 12/128,641, 6 pages.

Communication Pursuant to Article 94(3)EPC dated Apr. 19, 2010 issued in European Patent Application No. 09250195.6, 5 pages.

Communication Pursuant to Article 94(3)EPC dated Apr. 21, 2011 issued in European Patent Application No. 09250195.6, 4 pages.

Communication Pursuant to Article 94(3)EPC dated Sep. 29, 2011 issued in European Patent Application No. 09250195.6, 5 pages.

Notice of Allowance and Fee(s) Due for U.S. Appl. No. 12/128,638 mailed Sep. 1, 2011, 5 pages.

Extended European Search Report issued on Apr. 27, 2012 in European Application No. 12160184.3, 7 pages.

Summons to Attend Oral Proceedings Pursuant to Rule 115(1) EPC issued on May 30, 2012 in European Application No. 09250195.6, 5 pages.

Communication Pursuant to Article 94(3) EPC issued May 31, 2012 in European Application No. 09250191.5, 6 pages.

* cited by examiner

GENERIC IDENTITY MODULE FOR TELECOMMUNICATION SERVICES

FIELD OF THE INVENTION

Various embodiments are related to a generic identity module that can be personalized after delivery to a user of a mobile telecommunications device in the course of subscribing to a provider of telecommunications services.

BACKGROUND

A mobile telecommunications device such as a cellular telephone generally has installed within it an identity module that identifies the user to the provider of telecommunications services to which the user of the device has subscribed. Different telecommunications standards have different names for such an identity module, including: Subscriber Identity Module (SIM) in the GSM standard, Universal Integrated Circuit Card (UICC) in the UMTS standard, and Removable User identity Module (RUIM) in the CDMA standard. The identity module has stored securely therein one or more digital strings that identify the device in which the identity module is installed with a subscriber of the telecommunications services' provider. In the case of a SIM card, these strings include a unique International Mobile Subscriber Identity (IMSI) and one or more 128-bit authentication keys (Ki).

Identity modules generally, and in particular the "generic" identity module disclosed herein, are discussed herein in terms of SIMs according to the GSM standard. However, it will be clear to those skilled in the art how to apply the principles disclosed herein to identity modules of other telecommunication standards.

Figure 1:
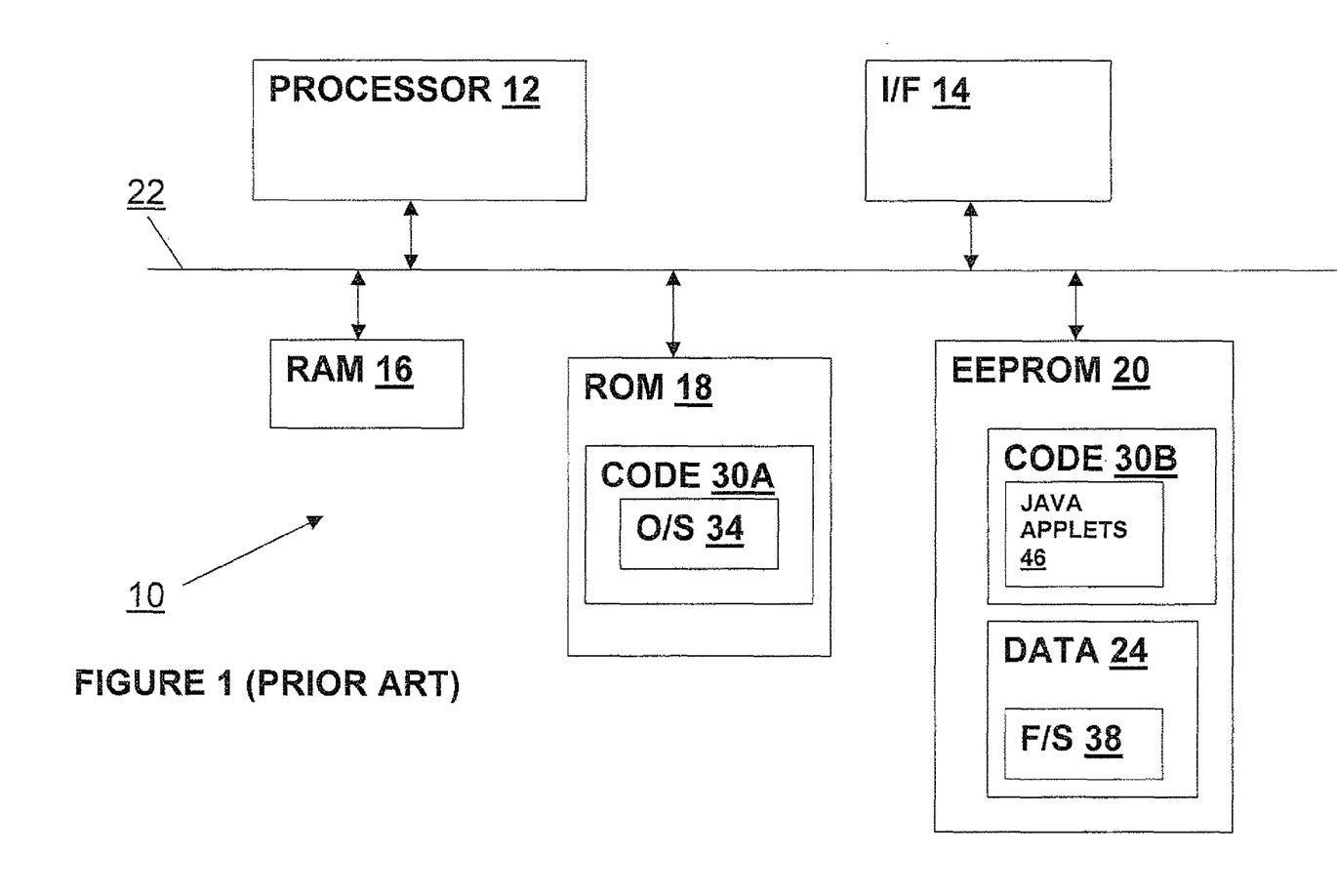
FIG. 1 is a high-level block diagram of a conventional SIM.

FIG. 1 is a high level block diagram of a conventional SIM 10. SIM 10 includes a processor 12, an external interface 14, and three memories: RAM 16, ROM 18 and EEPROM 20, all communicating with each other via a bus 22. RAM 16 is used by processor 12 as a working memory, for execution of code 30 stored in ROM 18 and EEPROM 20. Data 24, such as a SIM file system 38, as well as an IMSI and one or more Ki's, that personalize SIM 10 and associate SIM 10 with a provider of telecommuncation services, are stored in EEPROM 20.

FIG. 1 is a block diagram of a legacy SIM 10. High-capacity SIMs 10 have two interfaces 14, one for SIM functionality and the other for storage access.

Figure 2:
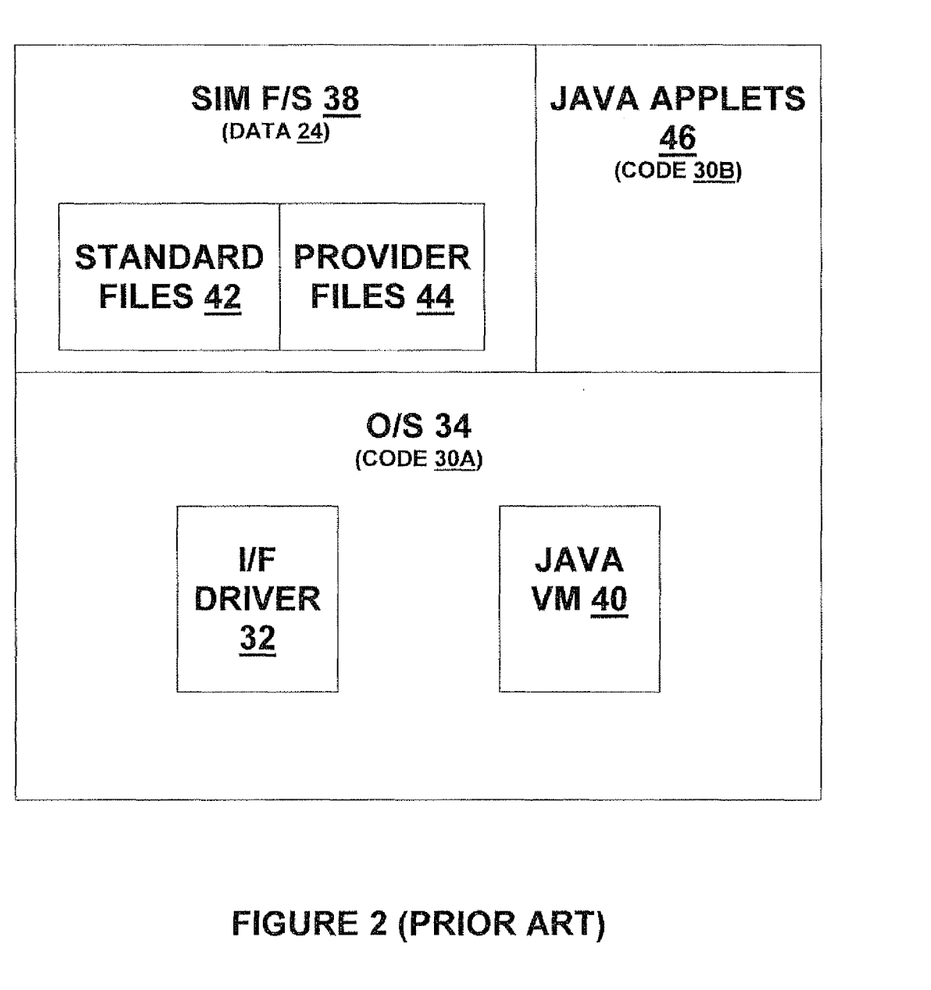
FIG. 2 shows the hierarchical architecture of the code of a conventional SIM.

FIG. 2 shows the hierarchical architecture of code 30 and its relationship to data 24. The lower layer of code 30 is an operating system 34 that includes a driver 32 of interface 14. (Operating system 34 of a high capacity SIM 10 would have two such drivers 32 for its two interfaces 14.) Operating system 34 also includes a JAVA virtual machine 40. Operating system 34 includes, inter alia, communications code that is executed by processor 12 in support of communication between the mobile telecommunications device, wherein SIM 10 is installed, and the telecommunications network of the provider that SIM 10 associates with the mobile telecommunications device. Above operating system 34 are SIM file system 38 and provider-specific JAVA applets 46. SIM file system 38 includes standard files 42 that are defined by the GSM standard and provider-defined files 44 that are specific to the provider. FIG. 1 shows that code 30 is distributed between code portion 30A in ROM 18 and code portion 30B in EEPROM 20. JAVA applets 46 are considered herein to be a part of code 30 and are stored in EEPROM 20. The remaining part of code 30 is stored in ROM 18. File system 38 is stored in EEPROM 20.

A SIM manufacturer contracting with a telecommunications service provider to provide devices such as SIM 10, installs all of code 30 and data 24 in SIM 10. Each such SIM 10 has unique data 24 (e.g. a unique IMSI and one or more unique Ki's) that, after the telecommunications services provider provides the SIM 10 to a s subscriber, identifies the telecommunications device in which that SIM 10 is installed as belonging to that subscriber. A SIM manufacturer can also produce for a telecommunication services provider a batch of SIMs 10 with temporary IMSIs that allow new subscribers to communicate with the telecommunications services provider and obtain their permanent IMSIs.

Initially, before being associated with a specific telecommunications services provider, each SIM 10 is generic. It would be highly advantageous to be able to sell such generic SIMs directly to users, and have the SIMs be personalized for the users as part of the procedure by which the users subscribe to their selected telecommunications services providers. Such generic SIMs could be sold by vendors who are not associated with specific telecommunications providers.

SUMMARY OF THE INVENTION

Herein is presented an identity module including: (a) a memory wherein is stored: (i) executable installation code for installing, in the memory, a customization suite that associates the identity module with a communication services provider, and (ii) executable communication code that, in combination with the customization suite, supports communication, by a host to which the identity module is operationally coupled, using communication services provided by the communication services provider; and (b) a processor for executing the executable installation code to install the customization suite in the memory and for then executing the executable communication code for communication using the communication services provided by the communication services provider.

Herein is presented a server including: (a) a communication interface for communicating with a host that is operationally coupled to an identity module that, when provided with a customization suite that associates the identity module with a communication services provider, supports communication services provided by the communication services provider; (b) a memory wherein is stored executable installation code for providing the customization suite to the host substantially in its entirety; and (c) a processor for executing the executable installation code.

Herein is presented a method of recruiting a new subscriber to a communication services provider, including: (a) receiving a request to provide a customization suite to be installed in an identity module in order to associate the identity module with a communication services provider, thereby enabling the identity module to support communication services provided by the communication services provider, the request being received from a host of the identity module, the identity module lacking any portion of the customization suite; (b) responding to the request by proposing to the host terms of usage of the communication services; and (c) upon receiving from the host a consent to the terms of usage, sending the customization suite to the host substantially in its entirety.

Herein is presented a method of doing business, including: (a) obtaining an identity module for using a host, wherein the identity module is operationally connected, to communicate using communication services provided by a communication services provider when the identity module has installed therein a customization suite that associates the identity module with the communication services provider, the identity module initially lacking any portion of any such customization suite; and (b) offering the identity module for sale to a potential subscriber of such a communication services provider.

Herein is presented a method of doing business, including: (a) configuring an identity module initially without any portion of a customization suite that associates the identity module with a communication services provider, the identity module being for using a host, wherein the identity module is operationally connected, to communicate using communication services provided by the communication services provider with which the identity module is associated by the customization suite; and (b) offering the identity module so configured for sale to a potential subscriber of such a communication services provider.

A basic generic identity module includes a memory bearing executable installation code, executable communication and a processor for executing the executable installation code and the executable communication code. The executable installation code is for installing, in the memory, a customization suite that associates the identity module with a communication services provider. The executable communication code, in combination with the customization suite, supports communication, by a host to which the identity module is operationally coupled, using communication services provided by the communication services provider. The processor is for executing the executable installation code to install the customization suite in the memory and then executing the executable communication code for communication using the communication services provided by the communication services provider. Preferably, no portion of any such customization suite is stored initially in the identity module. Hence, there is nothing stored in the identity module, not even a temporary IMSI, that associates the identity module with a specific communication services provider.

Preferably, the memory also has stored therein executable solicitation code for requesting the customization suite. Most preferably, the executable solicitation code is adapted to be executed by the processor. Also most preferably, the executable solicitation code includes executable code for establishing a secure channel for communicating with a provider of the customization suite.

Preferably, the memory is nonvolatile.

Preferably, the executable installation code includes executable code for substituting, for a first communication suite that associates the identity module with a first communication services provider and that is already installed in the memory, a second customization suite that associates the identity module with a second communication services provider. Following the substitution, a host of the identity module communicates using the services of the second communication services provider instead of the services of the first communication services provider. Alternatively, the executable installation code includes executable code that installs the second customization suite in the memory in addition to the first customization suite. Following the installation of the second customization suite, a host of the identity module can communicate using the services of either communication services provider.

Preferably, the memory also has installed therein executable deletion code for removing the customization suite from the memory, thereby restoring the identity module to its original condition of not being associated with a specific communication services provider.

A server for personalizing such an identity module includes a communication interface, a memory and a processor. The communication interface is for communicating with a host of the identity module. In the memory is stored executable installation code for providing substantially the entire customization suite to the host. The processor is for executing the executable installation code.

Preferably, the communication interface is an interface to a telecommunication network such as a telephony network or an internetwork.

Preferably, the executable installation code of the server is for providing the customization suite to the host contingent on satisfaction of a condition such as validation of credentials, such as a credit card number, of the entity that is requesting the customization suite.

Preferably, the server memory also has stored therein executable solicitation code for establishing a secure channel to the host for providing the customization suite to the host.

In a method of recruiting a new subscriber to a communication services provider, a request is received to provide a customization suite to be installed in an identity module in order to associate the identity module with the communication services provider. With the customization suite installed therein, the identity module supports communication services provided by the communication services provider. The request is received from a host of the identity module, such as a cellular telephone or a computer equipped with a card reader. When the request is received, no portion of the customization suite, not even a temporary IMSI, is installed in the identity module. Then, the request is responded to by proposing to the host terms of usage of the communication services. Upon receiving consent to the terms of usage from the host, substantially the entire customization suite is sent to the host.

Preferably, the method also includes establishing a secure channel to the host. The customization suite is sent to the host via the secure channel.

Preferably, the consent includes a credential such as a credit card number. The method includes validating the credential. The sending of the customization suite to the host is conditional on the credential being valid.

Preferably, the receiving of the request, the responding to the request and the sending of the customization suite are via a telecommunication network such as a telephony network or an internetwork.

A method of doing business includes obtaining such an identity module and offering the identity module for sale to a potential subscriber of a communication services provider without the identity module having installed therein a customization suite associating the identity module with any communication services provider. This is as opposed to offering such an identity module for sale to a communication services provider for personalization by the communication services provider. Preferably, the method also includes requesting a customization suite on behalf of the potential subscriber.

Another method of doing business includes configuring such an identity module initially without any portion of a customization suite and offering the identity module so configured for sale, directly or indirectly, to a potential subscriber of a communication services provider. This is as opposed to offering the identity module for sale to the communication services provider itself.

BRIEF DESCRIPTION OF THE DRAWINGS

The generic identity module is herein described, by way of example only, with reference to the accompanying drawings, wherein.

DESCRIPTION OF THE PREFERRED EMBODIMENTS

The principles and operation of a generic identity module may be better understood with reference to the drawings and the accompanying description.

Figure 3:
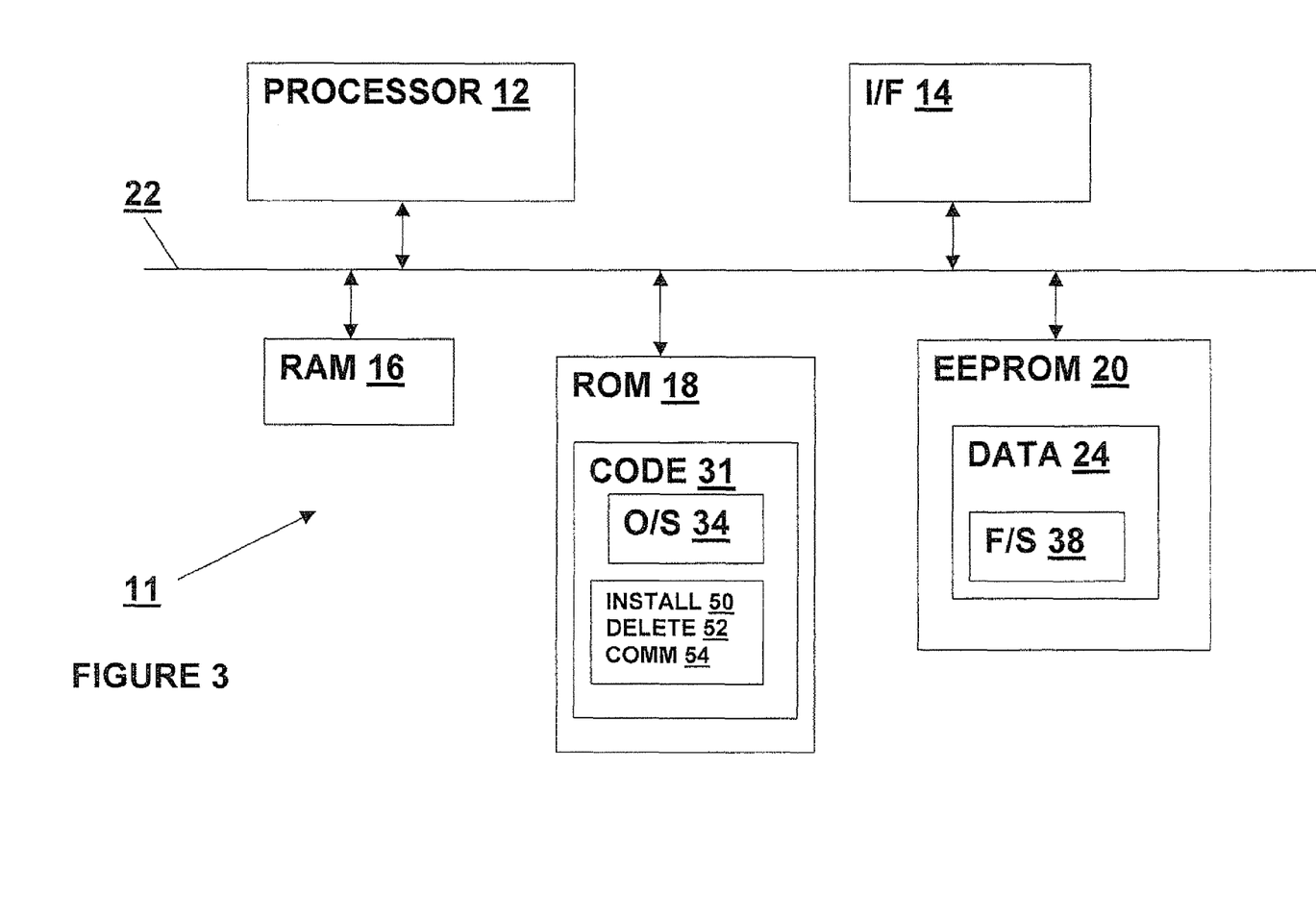
FIG. 3 is a high-level block diagram of an embodiment of a generic, pre-customization SIM.
Figure 4A:
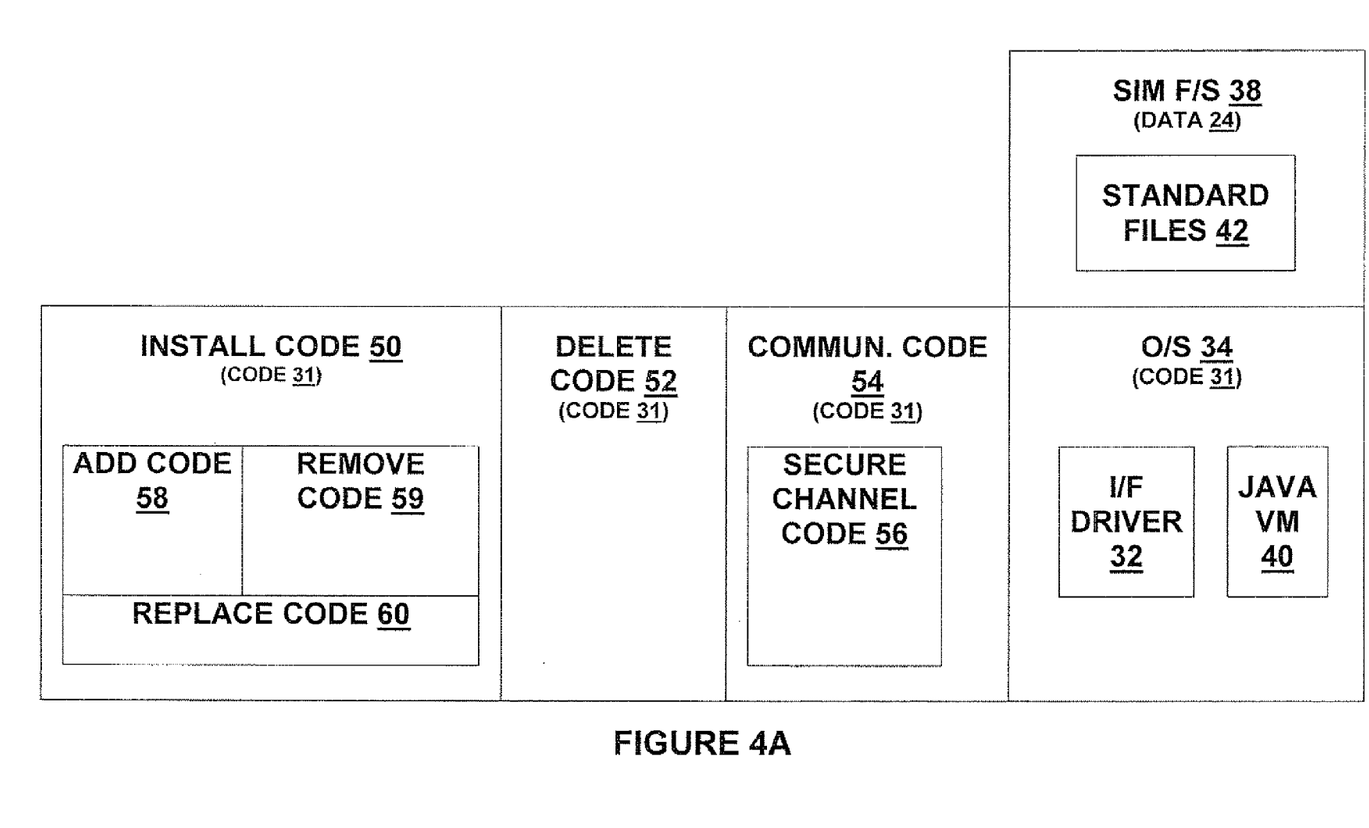
FIGS. 4A and 4C show the hierarchical architectures of the codes and data of two different generic SIMs prior to the installation of customization suites.

Referring again to the drawings, FIG. 3 illustrates a generic SIM 11 that can be personalized by a user. SIM 11 is identical to SIM 10, except that code 30 is replaced with modified code 31. FIG. 4A shows the hierarchical architecture of code 31 of an exemplary embodiment of such a generic SIM and its relation to data 24.

Like code 30 and data 24 of FIG. 2, code 31 and data 24 of FIG. 4A includes an operating system 34 with a driver 32 of interface 14 and a JAVA virtual machine 40, and a SIM file system 38 with standard files 42 but does not include either provider-defined SIM files 44 or any JAVA applets 46. Instead, code 31 of FIG. 4A includes installation code 50 for installing, in EEPROM 20 of SIM 11, the portion of code 30 and data 24 of FIG. 2 (provider-defined files 44 and JAVA applets 46) that associates conventional SIM 10 with a specific telecommunications services provider, and also for installing, in EEPROM 20 of SIM 11, data 24 that personalize SIM 11 for a specific subscriber of the telecommunications services provider. Installation code 50 is functionally equivalent to the code that a manufacturer of SIM 10 uses to install provider-defined files 44, JAVA applets 40 and the rest of data 24 in SIM 10.

Figure 4B:
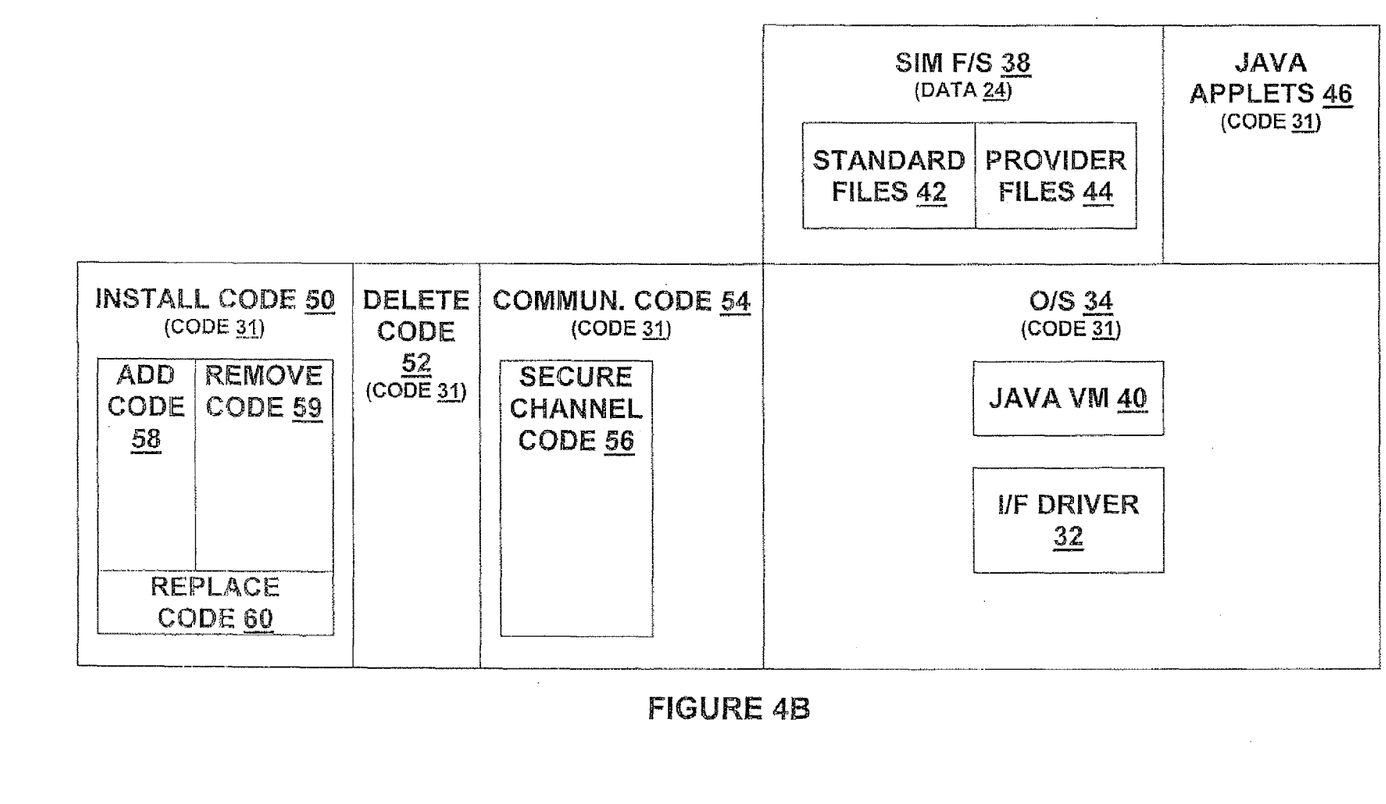
FIG. 4B shows the hierarchical architecture of the code and data of the generic SIM of FIG. 4A after the installation of a customization suite.

After processor 12 has executed installation code 50, the hierarchical architecture of code 31 and its relation to data 24 is as illustrated in FIG. 4B. Hence, provider-defined portion 44, JAVA applets 46 and the related data 24 are referred to collectively herein as a "customization suite" that associates SIM 11 with a specific subscriber of a specific telecommunications services provider.

In order to obtain the customization suite for installation, SIM 11 also includes communication code 54 that is executed by processor 12. While SIM 11 is installed in a host such as a cellular telephone, the host uses the communication code 54 to follow a data communication protocol such as GPRS to communicate with a server that is associated with the telecommunications services provider and request the customization suite.

Figure 5:
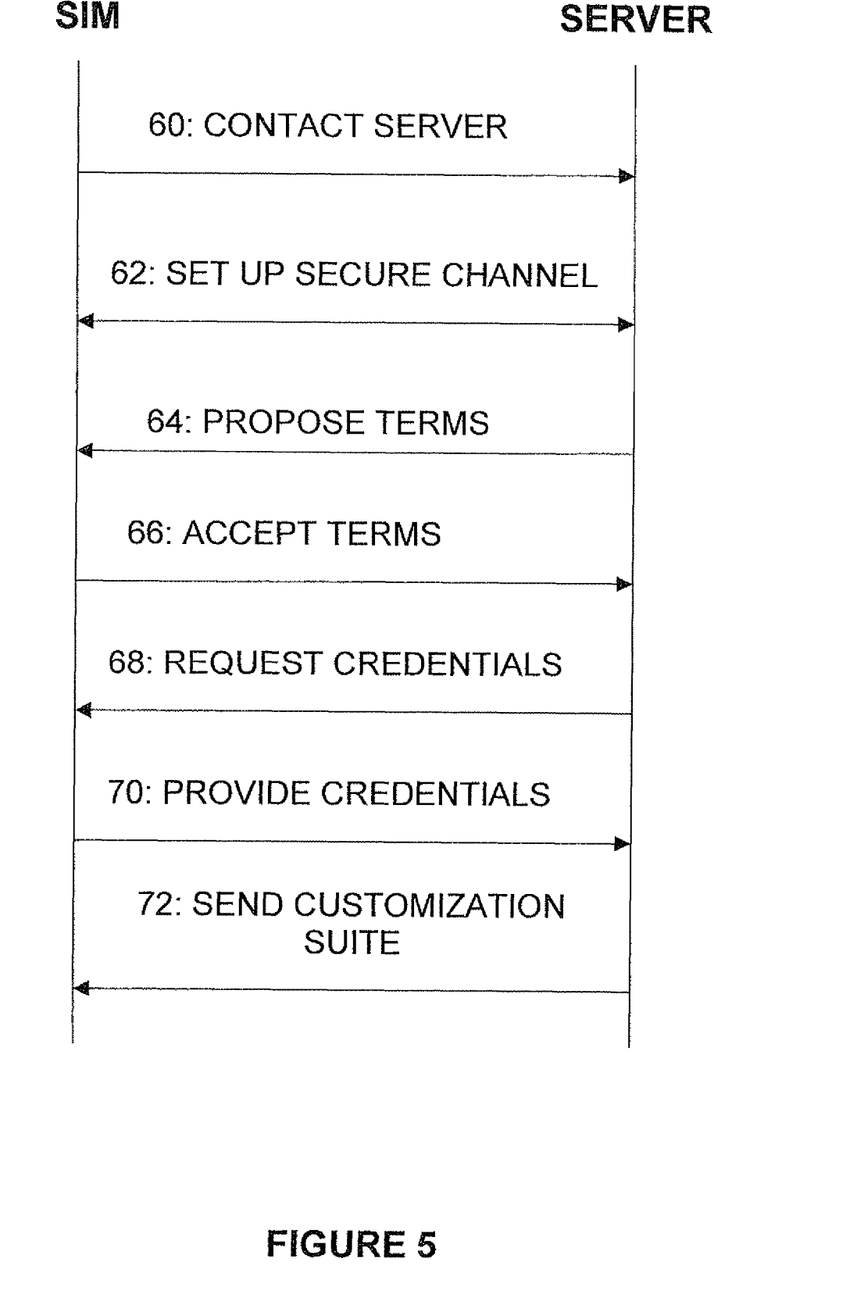
FIG. 5 shows the exchange of signals between a generic SIM and a server for requesting a customization suite.

FIG. 5 shows the exchange of signals between SIM 11 and a server for requesting a customization suite. In step 60, the user uses the cellular telephone in which SIM 10 is installed to initiate communication with the server. In step 62, SIM 11 and the server set up a secure channel for uploading user credentials to the server and downloading the customization suite to SIM 11, using methods known in the art that need not be detailed here. For that purpose, communication code 54 includes code 56 for setting up the secure channel. In step 64, the server proposes terms of usage to SIM 11. If the user decides to accept the proposed terms of usage, in step 66 the user uses the cellular telephone in which SIM 11 is installed to send a message to the server indicating acceptance of the terms of usage. In step 68, the server requests user credentials, such as a mailing address and a credit card number, for registering the user as a subscriber to the telecommunications services provider with which the server is associated. In step 70, the user uses the cellular telephone in which SIM 11 is installed to send the requested credentials to the server. In step 72, having authenticated the user credentials, the server sends the customization suite to SIM 11 for installation in SIM 11. Processor 12 executes communication code 54 to effect the SIM-11-side portion of the customization suite request.

Figure 6:
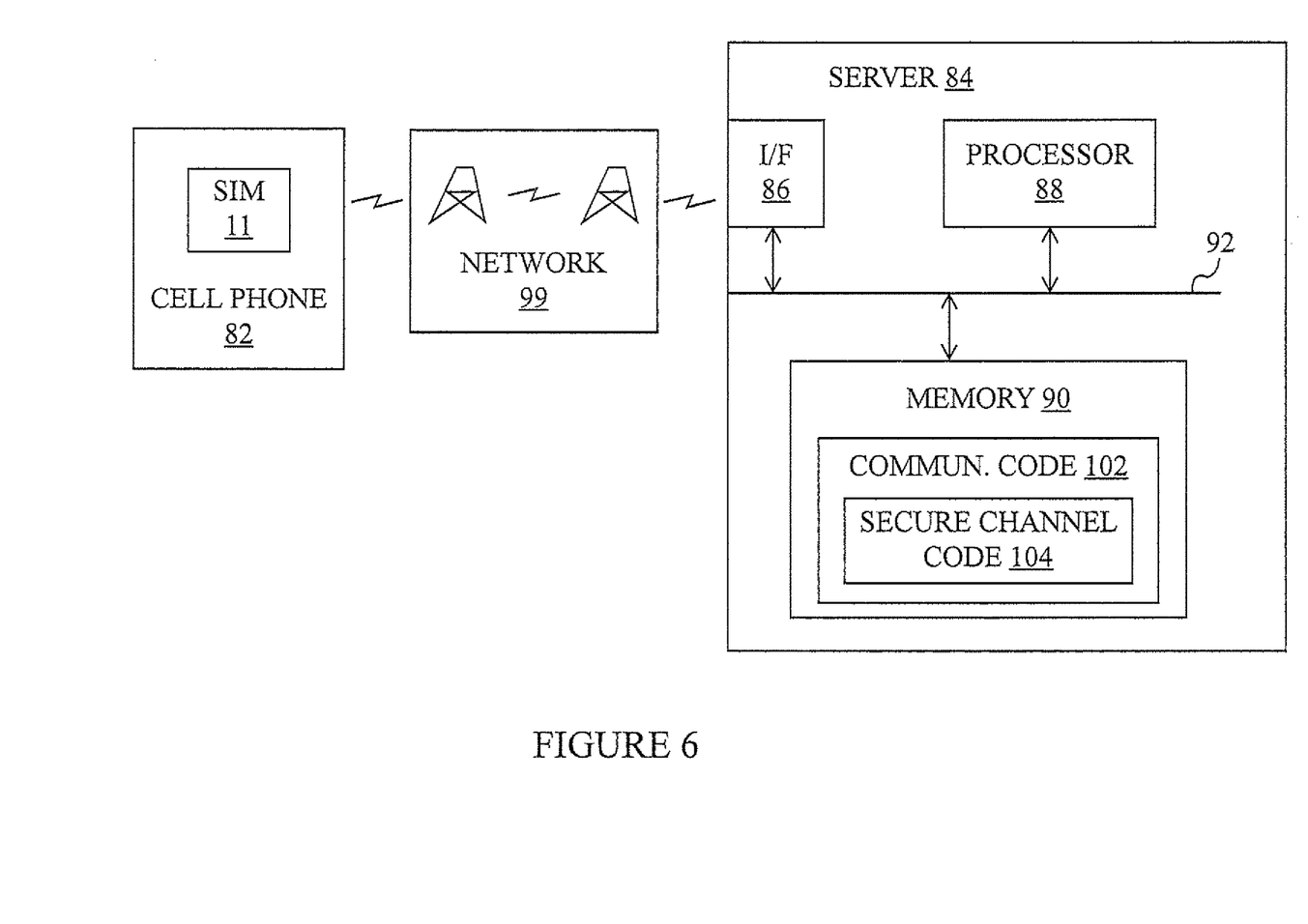
FIG. 6 is a high-level block diagram of a generic SIM in a cellular telephone requesting a customization suite from a server.

FIG. 6 shows SIM 11, installed in a cellular telephone 82, communicating with a server 84 via a cellular telephony network 94 to effect the steps illustrated in FIG. 5. Server 84 includes, among other components, an interface 86 to network 94, a memory 90 wherein is stored code 102 for implementing the server-side steps of FIG. 5, and a processor 88 for executing code 102. Interface 86, memory 90 and processor 88 communicate with each other via a bus 92. Code 102 includes, inter alia, secure channel code 104 that is similar to secure channel code 56.

FIGS. 4A and 4B also show code 31 of a generic SIM 10 as including deletion code 52 and as including, in installation code 50: a module 58 for adding to SIM 11 a second customization suite of a second telecommunications services provider (in addition to a first customization suite of a first telecommunications services provider that is already installed in SIM 11); a module 59 for deleting a customization suite from SIM 11; and a module 60 for substituting in SIM 11 a second customization suite of a second telecommunications services provider for a first customization suite of a first telecommunications services provider (that is already installed in SIM 11).

In some embodiments of a generic SIM 11, modules 58, 59 and 60 may be absent and deletion code 52 may be executed automatically, upon the successful completion of personalization of SIM 11, to delete installation code 50, communication code 54 and deletion code 52 itself. Subsequent to such deletion, the hierarchical structure of code 31 then is the same as that of code 30 of the prior art, as illustrated in FIG. 2. In other embodiments of a generic SIM 11, the execution of deletion code 52 may be optional.

Figure 7:
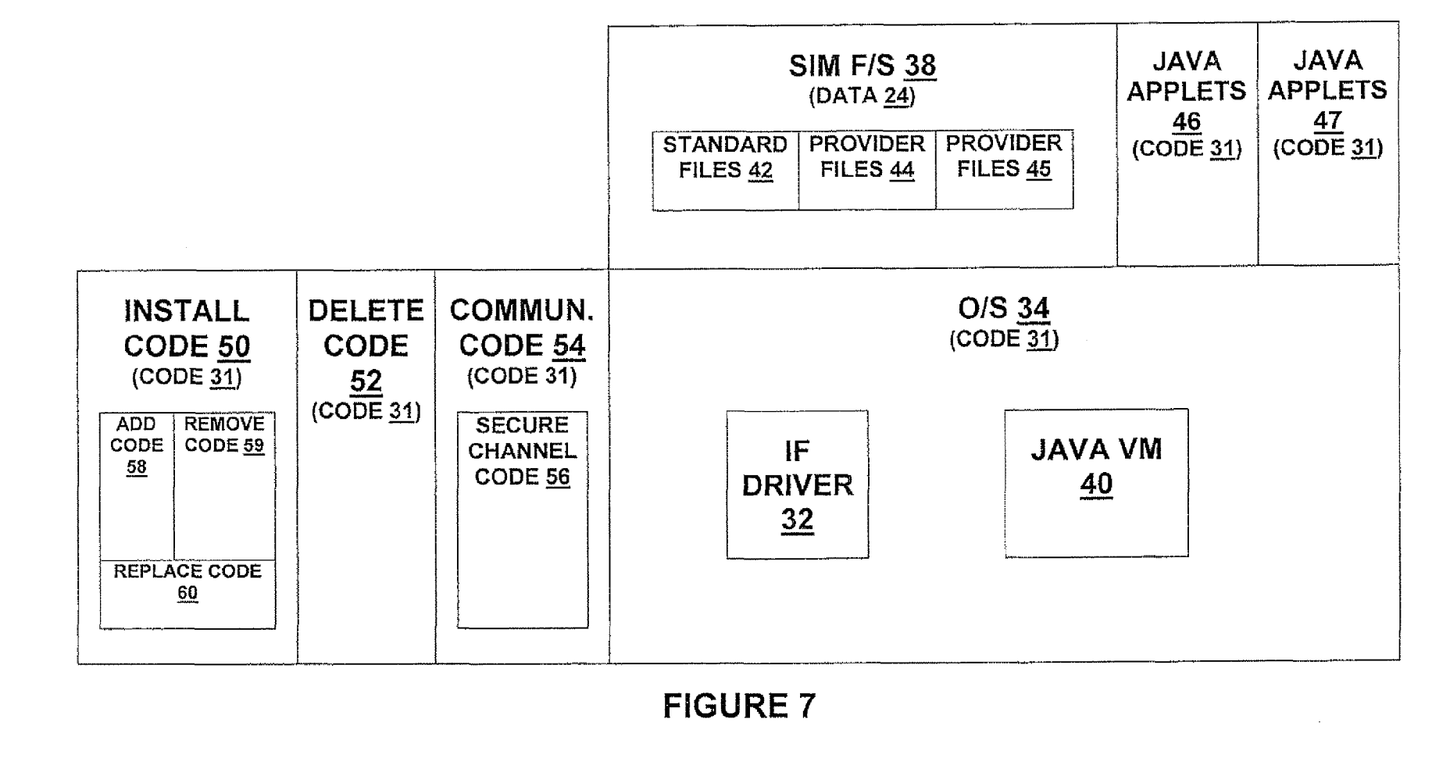
FIG. 7 shows the hierarchical architecture of the code and data of a generic SIM after the installation of two customization suites.

Module 58 gives the user the option of subscribing to two or more different telecommunications services providers at the same time. Executing module 58 effects the steps illustrated in FIG. 5 to add a second customization suite to SIM 11. The hierarchical architecture of code 31 after such an addition is illustrated in FIG. 7. In addition to files 44 and JAVA applets 46 that are specific to the first telecommunications provider, code 31 and data 24 now include files 45 and JAVA applets 47 of the second telecommunications provider. Module 59 gives the user the option of deleting any or all of the installed customization suites from SIM 11. Module 60 gives the user the option of substituting the customization suite of a A second telecommunications provider for the customization suite of a first telecommunications provider. Executing module 60 executes module 59 to delete an installed customization suite and then effects the steps illustrated in FIG. 5 to install the new customization suite.

Server 84 of FIG. 6 may be owned either by the manufacturer of generic SIM cards 11 or by a telecommunications services provider. If server 84 is owned by the manufacturer of generic SIM cards 11 then server 84 provides subscription services for telecommunications services providers that have made the appropriate arrangements with the manufacturer of generic SIM cards 11. In step 60 of FIG. 5, in addition to calling server 84, the user also specifies which telecommunications services provider the user wishes to subscribe to. In step 72 of FIG. 5, in addition to sending the user the customization suite, server 84 also sends the user's credentials to the selected telecommunications services provider, via cellular telephony network 94. If server 84 is owned by a telecommunications services provider, for example if the manufacturer of generic SIM cards 11 has sold server 84 to the telecommunications services provider, then in step 70 of FIG. 5, upon receiving the user's credentials, the telecommunication services provider sets up an account for the user.

Figure 4C:
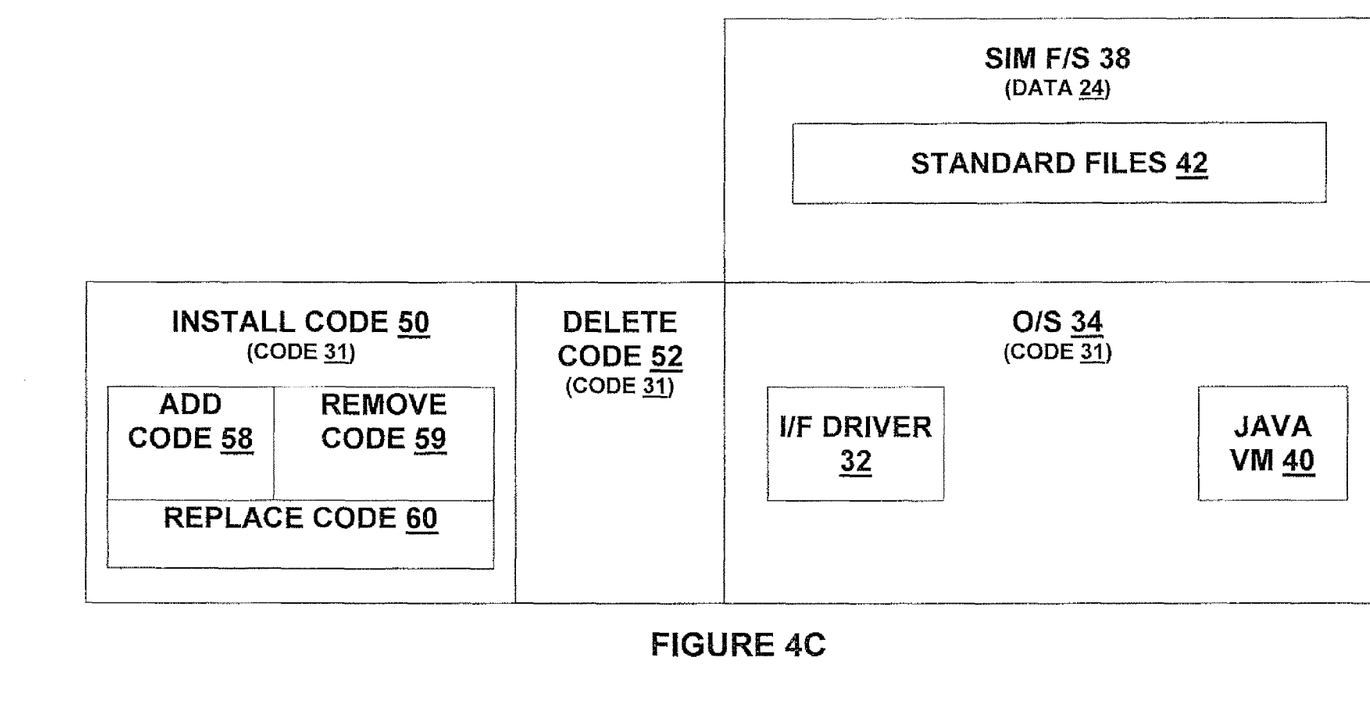
Figure 8:
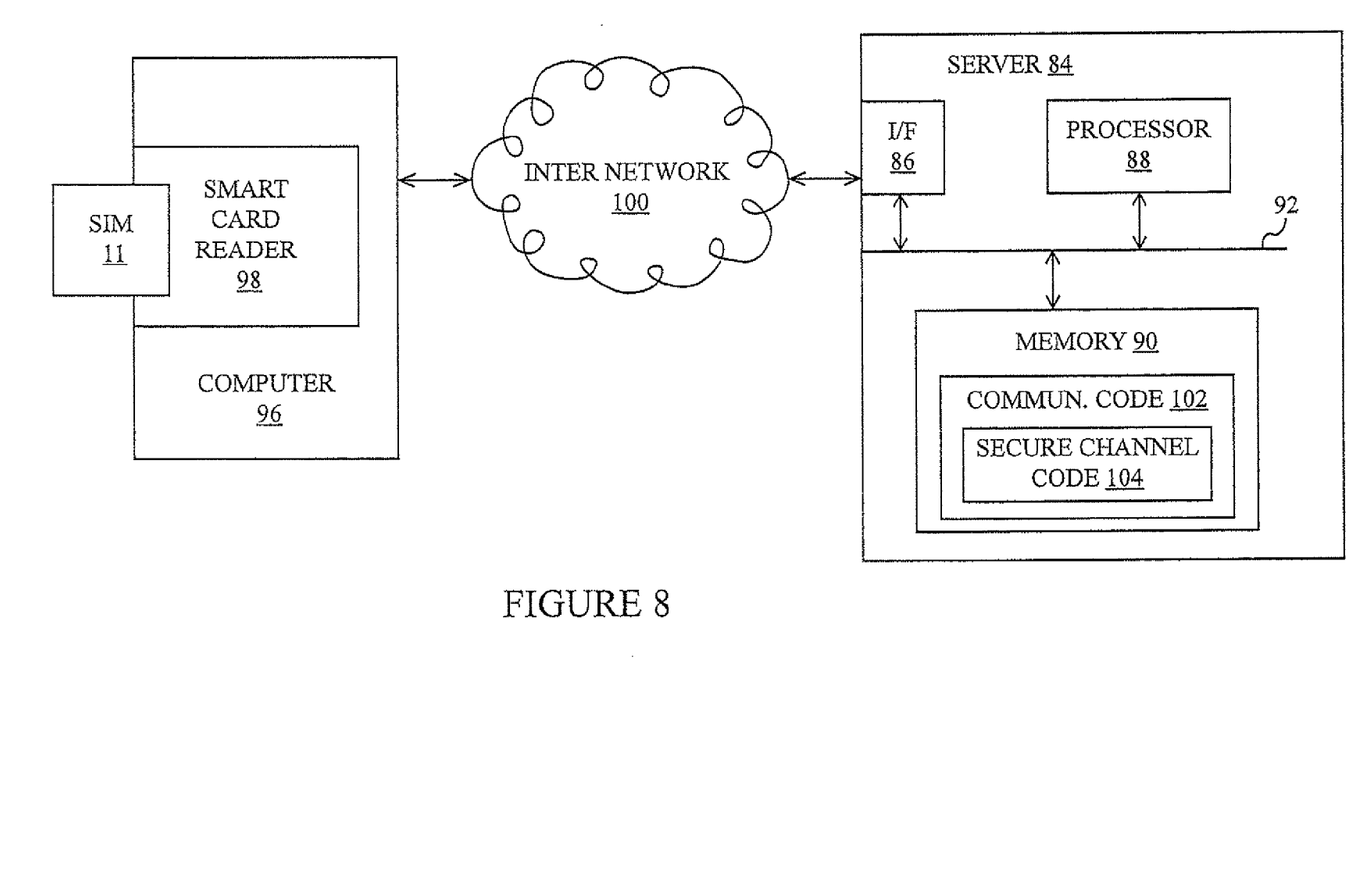
FIG. 8 is a high-level block diagram of a generic SIM coupled by a card reader to a computer requesting a customization suite from a server.

FIG. 8 shows an alternative mechanism for establishing communication is between SIM 11 and server 84. In FIG. 8, the host of SIM 11 is a computer 96 equipped with a smart card reader 98 to which SIM 11 is operationally coupled via its interface 14. Computer 96 communicates with server 84 via an internetwork 100 such as the Internet. Computer 96 would be used, for example, by a retail vendor of generic smart cards 11 who offers generic smart cards 11 for sale to users and who personalizes generic smart cards 11 for users who purchase generic smart cards 11. The manufacturer of generic smart cards 11, in turn offers generic smart cards 11 for sale to such retail vendors, instead of or in addition to offering conventional SIMs 10 for sale to telecommunications services providers. Optionally, code 54 for communicating with server 84 resides in computer 96 rather than in generic smart cards 11; the corresponding hierarchical architecture of code 31 of such a generic smart cards 11 is shown in FIG. 4C.

Yet another mechanism (not illustrated) for establishing communication between SIM 11 and server 84 may be a blend of the two mechanisms illustrated in FIGS. 6 and 8. In this mechanism, cell phone 82 communicates with server 84 via computer 96, using e.g. USB to communicate with computer 96.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An identity module comprising:
   a memory, wherein the memory is to store installation code for:
      installing in the memory a first customization suite that associates the identity module with a first communication services provider, wherein only after installation of the first customization suite the memory contains data correlating the identity module and the first communication services provider; and
      while the first customization suite is installed in the memory, installing in the memory a second customization suite that associates the identity module with a second communication services provider, wherein upon installation of the second customization suite, the identity module is associated with the second communication services provider and with the first communication services provider;
   a processor coupled to the memory, the processor operative to:
      establish a secure channel between the processor and a first server, the first server associated with the first communication services provider;
      after establishing the secure channel, receive terms of usage from the first server, the terms of usage associated with a first communication service offered by the first communication services provider; and
      after receiving the terms of usage from the first server, receive the first customization suite conditioned upon a host of the identity module having provided to the first server an indication of acceptance of the terms of usage, wherein the host is operationally coupled to the processor, wherein installation of the second customization suite while the first customization suite is installed enables concurrent access by the host to the second communication service provider and to the first communication service provider.

2. The identity module of claim 1, wherein the processor is further to install the received first customization suite and to receive the second customization suite while the first customization suite is installed.

3. The identity module of claim 1, wherein the memory is further to store executable deletion code to remove the first customization suite from the memory.

4. The identity module of claim 1, wherein the host is configured to communicate with the first communication services provider via a data network.

5. The identity module of claim 1, wherein the processor is further to receive the first customization suite from the server via the secure channel.

6. The identity module of claim 1, wherein the host is a cellular telephone.

7. The identity module of claim 1, wherein the host is a computer.

8. The identity module of claim 1, wherein the processor is further operative to, upon receipt of the first customization suite, execute the installation code to associate the identity module with the first communication services provider.

9. The identity module of claim 1, wherein upon installation of the first customization suite, installation of the second customization suite, and installation of a third customization suite that is associated with a third communication service provider, contemporaneous access by the host is enabled to each of the first communication service provider, the first communication service provider, and the third communication service provider.

10. A method comprising:
   establishing, by a host, a secure channel between the host and a first server, the first server associated with a first communication services provider that provides a first communication service;
   after establishing the secure channel, issuing, by the host, a request to receive a first customization suite, wherein the first communication services provider is accessible to the host conditioned upon installation by the host of the first customization suite into an identity module when the identity module is operationally coupled to the host;
   in response to the request, receiving terms of usage by the host from a first server, wherein the first server is associated with the first communication service provider, and wherein the terms of usage are associated with the first communication service;

receiving the first customization suite at the host from the first server conditioned on having provided an indication of acceptance of the terms of usage from the host to the first server;

installing, by the host, the first customization suite into the identity module while the identity module is coupled to the host to associate the identity module with the first communication services provider, enabling access by the host to the first communication services provider;

receiving, at the host, a second customization suite associated with a second communication services provider; and while the first customization suite is installed in the identity module, installing by the host the second customization suite into the identity module to enable access by the host to the second communication services provider while the host is enabled to access the first communication services provider, wherein installation of the second customization suite while the first customization suite is installed enables concurrent access by the host to the second communication service provider and to the first communication service provider.

11. The method of claim 10, wherein the first customization suite is received at the host from the first server via a data communication network.

12. The method of claim 10, wherein the first customization suite is received only after user credentials have been authenticated by the first communication service provider.

13. The method of claim 10, wherein the first customization suite is received at the host from the first server via the secure channel.

14. The method of claim 10, wherein only after installation of the second customization suite the identity module contains second data correlating the identity module and the second communication service provider.

15. A computer readable storage device storing processor-executable instructions that when executed by a processor, cause the processor to:

establish a secure channel between the processor and a first server, the first server associated with a first communication services provider;

after establishing the secure channel, receive terms of usage associated with a first communication service offered by the first communication services provider from the first server;

after receiving the terms of usage from the first server, receive a first customization suite conditioned upon a host of the processor having provided to the first server an indication of acceptance of the terms of usage; and after receiving the first customization suite, execute first installation code to install the first customization suite in an identity module when the identity module is operationally coupled to the host, wherein upon installation the first customization suite is to associate the identity module with the first communication services provider, wherein only after installation of the first customization suite the identity module contains data correlating the identity module and the first communication services provider;

receive a second customization suite associated with a second communication services provider; and install the second customization suite in the identity module while the first customization suite is installed in the identity module, wherein upon installation of the second customization suite in the identity module, the identity module is associated with the second communication services provider while the identity module is associated with the first communication services provider, wherein installation of the second customization suite while the first customization suite is installed enables concurrent access by the host to the second communication service provider and to the first communication service provider.

16. The non-transitory computer readable medium of claim 15, wherein the first customization suite is received via a wireless network.

17. The computer readable storage device of claim 15, wherein the identity module includes the processor.

18. A system comprising:

a host having a telecommunication interface to communicate with a first communication service provider, wherein the host is operative to provide to the first communication service provider an indication of acceptance of terms of usage; and an identity module operationally coupled to the host, the identity module including:

non-volatile memory storing:

executable solicitation code for requesting a first customization suite that associates the identity module with the first communication service provider, the first customization suite to be downloaded from a first server associated with the first communication service provider; and executable installation code for installing in the non-volatile memory the first customization suite, wherein only after installation of the first customization suite the identity module contains data correlating the identity module and the first communication service provider; and a processor coupled to the non-volatile memory, wherein the processor is operative to:

establish a secure channel between the identity module and the first server;

after establishing the secure channel, receive terms of usage from the first server;

after receiving the terms of usage, receive the first customization suite from the first communication service provider in response to the host providing an indication of acceptance of the terms of usage;

after receiving the first customization suite, executing the installation code to install the first customization suite in the identity module that upon installation associates the identity module with the first communication service provider; and after installing the first customization suite in the non-volatile memory, install a second customization suite of a second communication service provider in the identity module while the first customization suite is installed in the non-volatile memory, wherein upon installation, the second customization suite associates the identity module with the second communication service provider while the identity module maintains association with the first communication service provider, wherein installation of the second customization suite while the first customization suite is installed enables concurrent access by the host to the second communication service provider and to the first communication service provider.

19. The system of claim 18, wherein the host is a cellular telephone.

20. The system of claim 18, wherein the host is a computer.

* * * * *